(12) United States Patent  
Kawachiya et al.

(10) Patent No.: US 9,003,146 B2  
(45) Date of Patent: Apr. 7, 2015

(54) MANAGING MEMORY OF A COMPUTER

(75) Inventors: Kiyokuni Kawachiya, Kanagawa (JP); Kazunori Ogata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/564,958

(22) Filed: Aug. 2, 2012

(65) Prior Publication Data

US 2013/0036282 A1    Feb. 7, 2013

(30) Foreign Application Priority Data

Aug. 3, 2011    (JP) .................................. 2011-169705

(51) Int. Cl.
- *G06F 12/00* (2006.01)
- *G06F 12/02* (2006.01)
- *G06F 12/14* (2006.01)
- *G06F 9/46* (2006.01)

(52) U.S. Cl.
CPC .............. *G06F 12/02* (2013.01); *G06F 12/14* (2013.01); *G06F 12/0253* (2013.01); *G06F 12/1433* (2013.01); *G06F 9/46* (2013.01)

(58) Field of Classification Search
None
See application file for complete search history.

(56) References Cited

U.S. PATENT DOCUMENTS

| 7,165,255 B2 * | 1/2007 | Czajkowski et al. | .......... 718/104 |
| 7,412,572 B1 * | 8/2008 | Shavit et al. | .................. 711/152 |

FOREIGN PATENT DOCUMENTS

| JP | 06-089222 A | 3/1994 |
| JP | 2006-018705 A | 1/2006 |
| JP | 2010-015223 A | 1/2010 |

OTHER PUBLICATIONS

K. Ogata, Marusa, the memory analysis tool for Java® VM, ProVISION, No. 59, 2008, p. 86-92. (http://www-06.ibm.com/ibm/jp/provision/no59/pdf/59_paper3.pdf).

Skape, Memalyze: Dynamic Analysis of Memory Access Behavior in Software, Jul. 2004, p. 1-13. (http://www.uninformed.org/?v=7&a=1&t=pdf).

* cited by examiner

*Primary Examiner* — Midys Rojas
(74) *Attorney, Agent, or Firm* — Cantor Colburn LLP

(57) ABSTRACT

A method for managing data in a memory of a computer. The method includes the steps of: prohibiting a specified memory area in a memory from being accessed temporarily or intermittently; and attaching, to first data, a first mark indicating that the first data has been read when a page fault has occurred as a result of an access by any process to read on the first data; where the first data is present in a specified memory area prohibited from being accessed; and where at least one of the steps is carried out using a computer device.

17 Claims, 5 Drawing Sheets

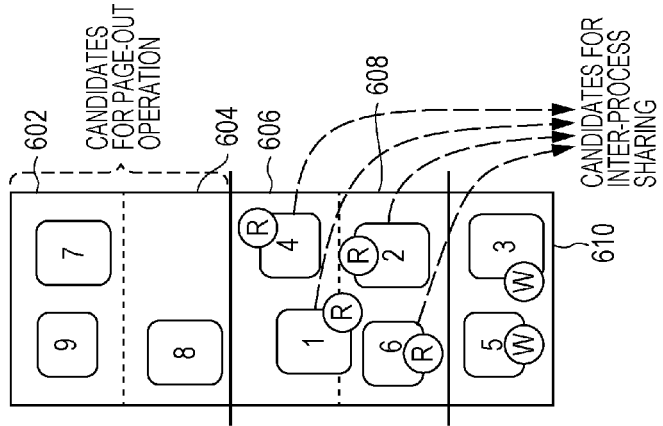
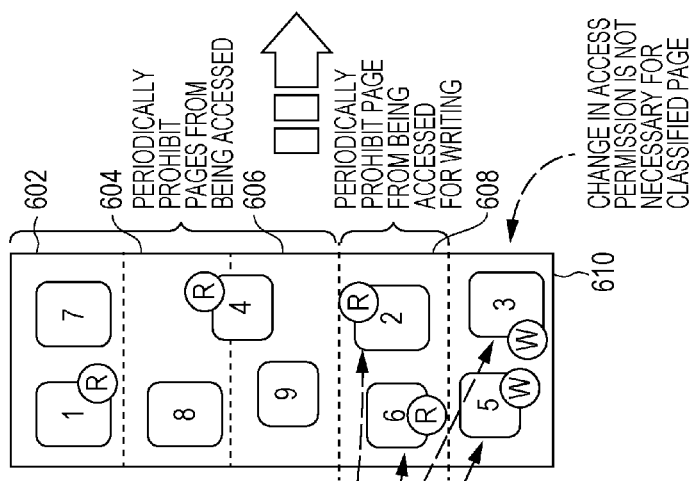
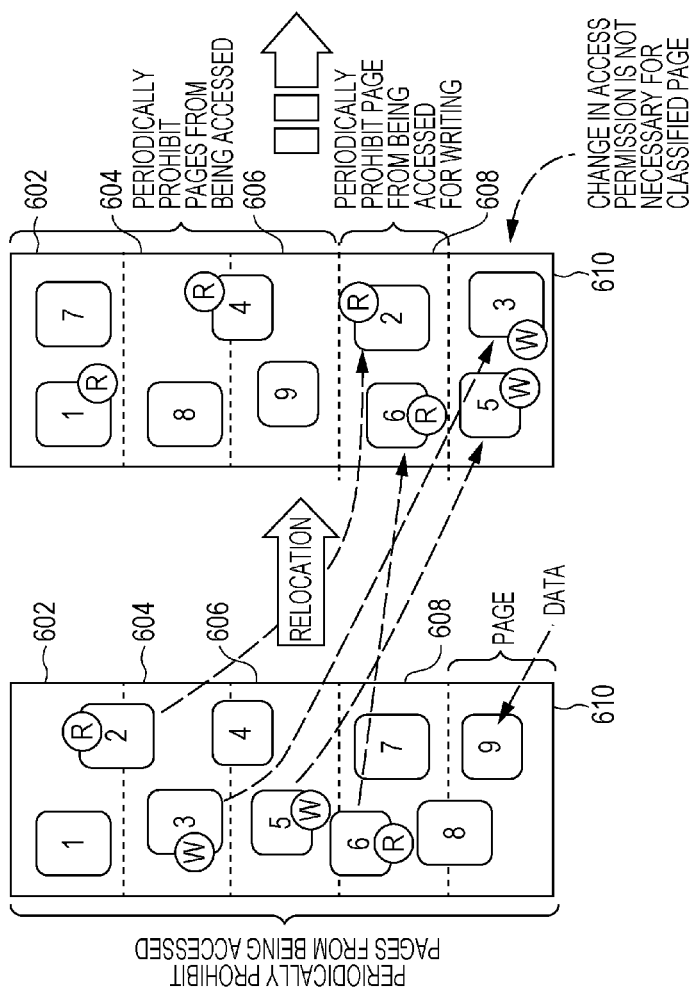

MANAGING MEMORY OF A COMPUTER

CROSS-REFERENCE TO RELATED APPLICATION

This application claims priority under 35 U.S.C. §119 from Japanese Patent Application No. 2011-169705 filed Aug. 3, 2011, the entire contents of which are incorporated herein by reference.

BACKGROUND OF THE INVENTION

1. Field of the Invention

The present invention relates to a technique for managing the memory of a computer. More particularly, the present invention relates to a technique that improves efficiency in usage of the physical memory of a computer.

2. Description of Related Art

It is almost always necessary to use physical memory as the main memory of a computer. On the other hand, since the size of the physical memory is limited, efficiency in usage of the physical memory has been improved by employing a technique for paging out as virtual memory.

Recently, cloud computing is increasingly used. Cloud computing uses a mechanism employing multiple guest environments that operate on a single machine by means of virtualization. Accordingly, there is a greater need for improving efficiency in usage of the physical memory.

To manage the physical memory effectively, it is necessary to grasp the system information about what type of data is present at each of the memory addresses.

For example, a memory analysis tool for a Java® VM, Marusa, developed by the inventors of the present application, detects the type of data in each of the addresses in a Java® virtual machine (JVM) by combining information about the memory usage in each of JVM data structures with the process memory management information from an operating system (OS). However, Marusa provides no information about how each piece of data is accessed.

Japanese Unexamined Patent Application Publication No. 6-89222 discloses a technique that allows optimal selection of a page that is to be swapped out from the physical memory of a computer system, where the physical memory has a page management mechanism and an elapsed-time management mechanism. In this technique, the elapsed-time management mechanism evaluates an accessed/not-accessed flag that represents the access state of each of pages in each of elapsed-time management cycles, generates a multi-bit vector for recording an access history of the page, and stores the multi-bit vector in a repository. However, this technique is not used to determine the types of access made to pieces of data in a page.

Japanese Unexamined Patent Application Publication No. 2006-18705 discloses a technique in which memory access is traced over a wide memory area or a memory area that is assigned to an application. This technique includes: a memory area that is to be assigned to a program is acquired; the acquired memory area is used as a target memory area to be checked; an MMU prohibits the acquired memory area from being accessed; a trace data area which corresponds to the target memory area to be checked is allocated; the MMU generates an access exception when the target memory area to be checked is accessed; and a trace processor records obtained trace information in the trace data area corresponding to the target memory area in which the access exception has occurred. Since an area in which data to be checked is present is continuously prohibited from being accessed in order to detect an access exception, the technique's processing load is rather heavy.

Japanese Unexamined Patent Application Publication No. 2010-15223 discloses a technique that prevents an access speed from being decreased even when a garbage collection process is performed, because of an object that has not been accessed for a long time period. To isolate an object that has not been accessed for a predetermined long time period and that is present in a virtual memory space, the following steps are executed when garbage collection is performed on a computer: a first step of detecting an object that has not been accessed for the predetermined long period, as a no-access object; a second step of moving the no-access object to a newly allocated virtual memory area when a predetermined time period has elapsed after the no-access object was detected; and a third step of, when another predetermined time period has elapsed after the no-access object was moved to the newly allocated virtual memory area, preventing the garbage collection from being allowed to access the newly allocated virtual memory area, which is regarded as an inaccessible area. In this technique, however, only data's accessed status is detected.

A tool called "Memalyze" discloses a paging mechanism that captures all memory accesses to a specified area without failure. However, similar to the technique described in Japanese Unexamined Patent Application Publication No. 2006-18705, the processing load of "Memalyze" is extremely heavy.

SUMMARY OF THE INVENTION

Accordingly, one aspect of the present invention provides a method for managing data in a memory of a computer, the method including the steps of: prohibiting a specified memory area in a memory from being accessed temporarily or intermittently; and attaching, to first data, a first mark indicating that the first data has been read when a page fault has occurred as a result of an access by any process to read on the first data; where the first data is present in a specified memory area prohibited from being accessed; and where at least one of the steps is carried out using a computer device.

Another aspect of the present invention provides a method for managing data in a memory of a computer, the method including the steps of: prohibiting a specified memory area in the memory from being accessed for writing temporarily or intermittently; and attaching, to data, a mark indicating that the data has been written when a page fault has occurred as a result of an access by any process to write on the data; where the data is present in the memory area prohibited from being accessed for writing; and where at least one of the steps is carried out using a computer device.

Another aspect of the present invention provides a non-transitory computer readable storage medium tangibly embodying a computer readable program code having computer readable instructions which when implemented, cause a computer to carry out the steps of a method including: prohibiting a specified memory area in a memory from being accessed temporarily or intermittently; and attaching, to first data, a first mark indicating that the first data has been read when a page fault has occurred as a result of an access by any process to read on the first data; where the first data is present in a specified memory area prohibited from being accessed.

Another aspect of the present invention provides a system for managing data in a memory of a computer, the system including: program instructions to prohibit a specified memory area in a memory from being accessed temporarily or intermittently; and program instructions to attach, to first data, a first mark indicating that the first data has been read when a page fault has occurred as a result of an access by any process to read on the first data; where the first data is present in a specified memory area prohibited from being accessed.

BRIEF DESCRIPTION OF THE DRAWINGS

FIG. 6(a) illustrates a state where data are located in pages in the memory according to an embodiment of the present invention.

FIG. 6(b) illustrates a data relocation process that relocates the data to which "R" labels are attached into a page and the data to which "W" labels are attached into another page according to an embodiment of the present invention.

FIG. 6(c) illustrates a result obtained after the relocation process is repeated according to an embodiment of the present invention.

DETAILED DESCRIPTION OF THE PREFERRED EMBODIMENTS

Figure 1:
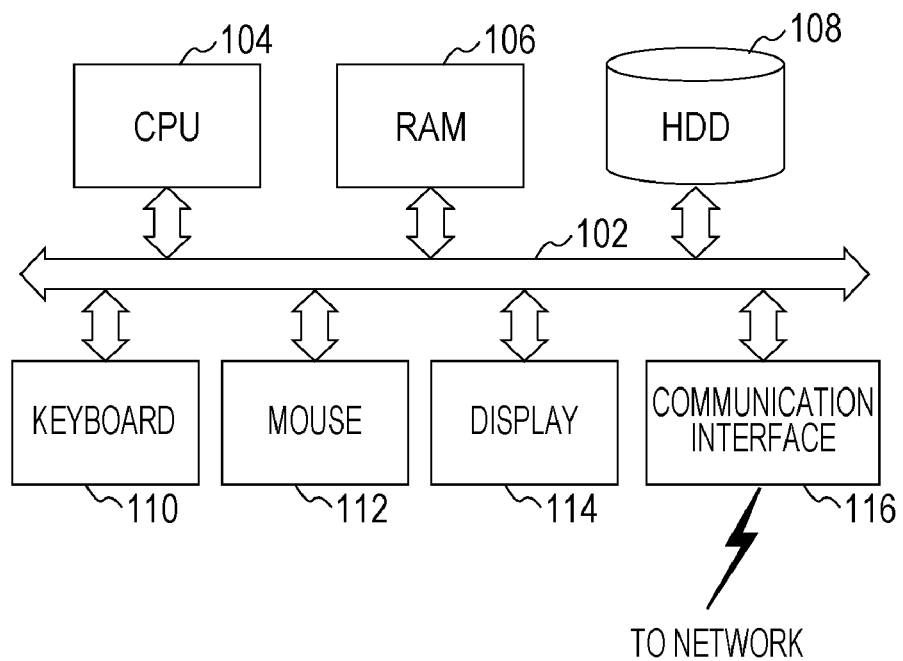
FIG. 1 is a block diagram illustrating exemplary hardware used for implementing the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is an object of the present invention to provide a technique for detecting, with low overhead, a property which indicates that access for reading or writing has been made to data in the memory of a computer.

It is another object of the present invention to provide a technique for optimizing data by relocating the data in the memory on the basis of the detected data property.

To solve the above-described problems, the present invention provides a memory classification profiler having functions as described below. The memory classification profiler operates in a state where the memory classification profiler is attached to a target process initiated by a target application.

Specifically, the memory classification profiler intermittently prohibits pages used for the target process from being accessed or being accessed for writing. This operation can be performed only on a memory area to be checked.

The memory classification profiler serves as a function of a page fault handler for a target address. That is, when a page fault is detected, the memory classification profiler notifies the target process of the address and the access type regarding the page fault, and returns the page back to the original state. When the access is for reading, the memory classification profiler can first change the page so that only reading is allowed and writing is prohibited.

The target process identifies data at the address from the information obtained through the notification and classifies the data into three types:

N-type that indicates data to which no access has been made (after a certain time point);
R-type that indicates data to which access only for reading has been made; and
W-type that indicates data to which access for reading and writing has been made.

A memory allocation mechanism for the target process relocates (expels) R-type data and W-type data into respective different pages on the basis of the check result, and the measurement is continued. This relocation can be performed not by the memory allocation mechanism for the target process but by a garbage collection (GC) process dynamically. Alternatively, upon the next startup of the target application, the relocation can be statically performed in accordance with the check result obtained until the relocation is to be performed.

According to the present invention, the memory classification profiler merely intermittently, i.e., periodically or temporarily, prohibits the pages used for the target process from being accessed or being accessed for writing, whereby the data to which access is made can be classified with low overhead in processing.

In addition, by relocating data on the basis of the classification result, W-type and R-type data can be excluded from target data to be checked, improving the precision of the profiler. Furthermore, an area to which access is prohibited can be decreased, thereby reducing the measurement overhead.

Referring to FIG. 1, a block diagram is illustrated which illustrates computer hardware for implementing a system configuration and operations according to one embodiment of the present invention. In FIG. 1, a CPU 104, a main memory (RAM) 106, a hard disk drive (HDD) 108, a keyboard 110, a mouse 112, and a display 114 are connected to a system bus 102. The CPU 104 is preferably based on the architecture of 32 or 64 bits. For example, Pentium® 4 of Intel Corp., Core™ 2 DUO of Intel Corp., or Athlon® of AMD Corp. can be used for the CPU 104. The main memory 106 preferably has a memory size of 2 GB or more, and more preferably has a memory size of 4 GB or more.

The hard disk drive 108 stores an operating system. Any operating system which is compatible with the CPU 104 can be used, such as Linux®, Windows® 7, Windows XP®, or Windows® 2003 server of Microsoft Corp., or Mac OS® of Apple Computer, Inc.

The hard disk drive 108 also stores a program, such as Apache, which causes the system to serve as a Web server. Upon the startup of the system, such a program is loaded into the main memory 106.

The hard disk drive 108 further stores a Java® Runtime Environment program for implementing the Java® virtual machine (JVM), which is loaded into the main memory 106 upon the startup of the system.

The hard disk drive 108 furthermore stores a memory classification profiler 204 (FIG. 2) for implementing a function of the present invention, in the form of an executable file. It is possible to create the memory classification profiler 204 by using a compiler that can create executable codes that are compatible with the CPU 104, through an existing programming language processor, such as C, or C++. The memory classification profiler 204 is loaded into the main memory 106 when it is to be used.

The keyboard 110 and the mouse 112 are used for operating graphic objects, such as an icon, a task bar, and a text box, which are displayed on the display 114, in accordance with the graphical user interface provided by the operating system.

The display 114 is preferably an LCD monitor having a resolution of 1024 768 or higher and having 32-bit true color, but is not limited to this. The display 114 is used for, for example, displaying the progress of a data relocation process that is performed in the memory and that is described below.

A communication interface 116 is preferably connected to a network by using the Ethernet® protocol. The communication interface 116 receives a processing request from a client computer (not illustrated) or transmits a processing result to a client computer (not illustrated) in accordance with a communications protocol such as TCP/IP by using a function provided by Apache.

Figure 2:
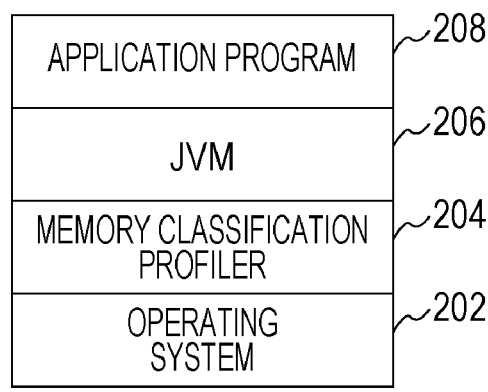
FIG. 2 is a diagram illustrating layers of a functional configuration according to an embodiment of the present invention.

FIG. 2 is a diagram illustrating a hierarchy for a program or a process used when data used by the JVM which employs the present invention is classified. An operating system 202 operates on the hardware illustrated in FIG. 1, and the memory classification profiler 204 operates on the operating system 202. A Java® virtual machine (JVM) 206 operates on the operating system 202, and the JVM 206 calls the function of the memory classification profiler 204. Consequently, the hierarchy is illustrated in which the JVM 206 is located in the memory classification profiler 204.

An application program 208, which is constituted by Java® byte codes, operates on the JVM 206, and calls the function of the memory classification profiler 204 through the JVM 206 when necessary. The hard disk drive 108 stores a JIT compiler (not illustrated), and the JIT compiler can convert the application program 208 into binary codes that are to be directly executed by the operating system 202. In this case, the binary codes obtained through the compiling performed by the JIT compiler cause a direct call of the function of the memory classification profiler 204.

The memory classification profiler 204 can be achieved in the form of, for example, a Java® virtual machine tool interface (JVMTI) agent. Alternatively, the function of the memory classification profiler 204 can be implemented as one of the functions of the operating system 202.

Furthermore, the function of the memory classification profiler 204 can be implemented on a virtual machine monitor that is used in, for example, a cloud environment.

Figure 3:
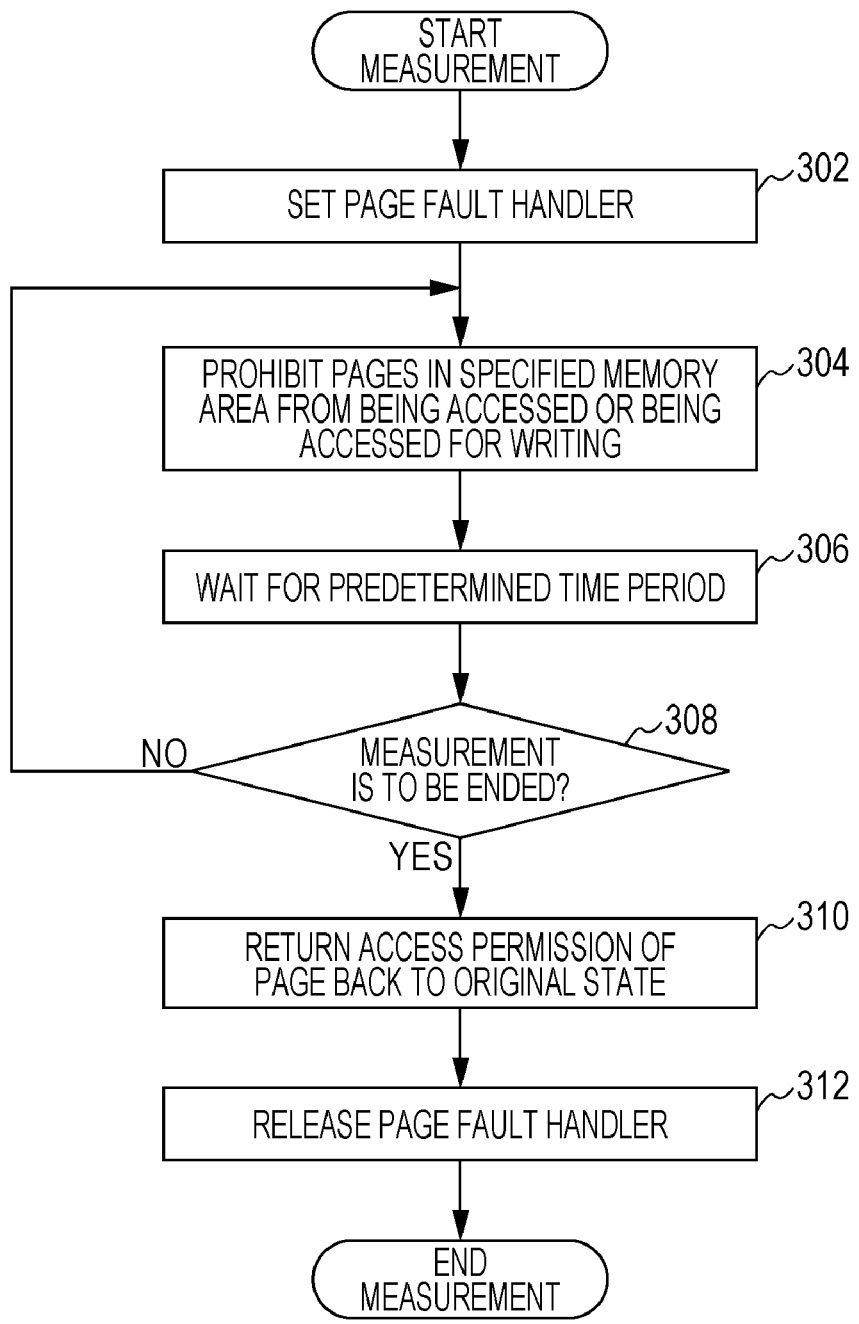
FIG. 3 is a flowchart of a process performed by a memory classification profiler according to an embodiment of the present invention.
Figure 4:
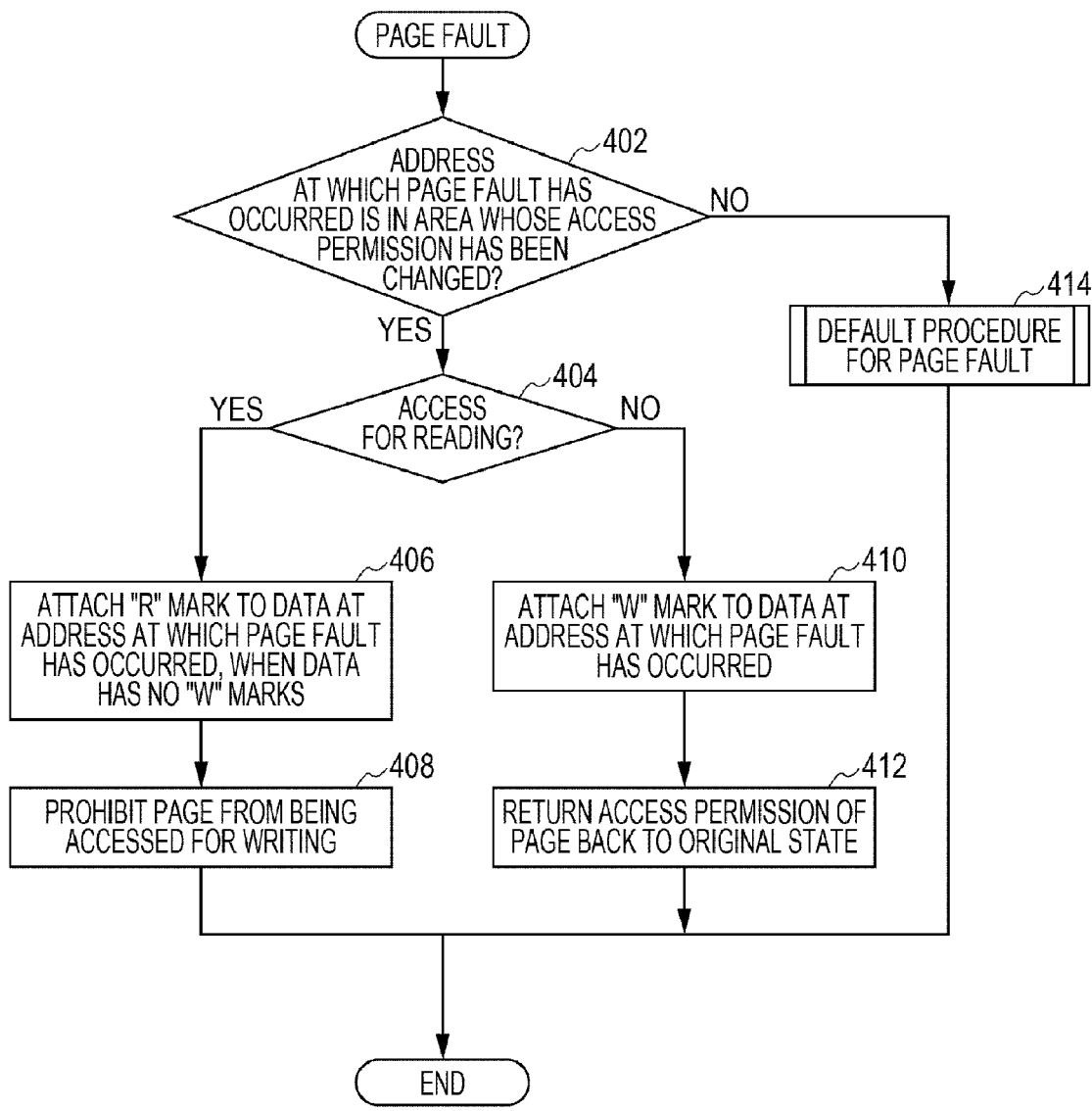
FIG. 4 is a flowchart of a process performed when a page fault occurs according to an embodiment of the present invention.

Referring to flowcharts in FIGS. 3 to 5, the processes of the present invention will be described. FIG. 3 illustrates a process in which the JVM 206 measures an access condition of data (such as objects and class data) in a predetermined area in the memory.

When the JVM 206 calls the memory classification profiler 204 and instructs the memory classification profiler 204 to start the measurement, the memory classification profiler 204 sets a page fault handler in step 302. The page fault handler is a part of the function of the memory classification profiler 204, and preferably uses the functions of the operating system 202.

In step 304, the memory classification profiler 204 prohibits pages in a memory area that is specified by the JVM 206 from being accessed or being accessed for writing. The determination whether the pages are to be prohibited from being accessed or being accessed for writing depends on the condition of data to be checked. To prohibit a memory area from being accessed, the memory classification profiler 204 preferably calls the functions of the operating system 202. For example, a system call, mprotect, is prepared in Linux®. This system call has the format of "int mprotect (const void *addr, size_t len, int prot)" and sets an area (on a page-by-page basis), which starts from the address indicated by addr and which has a length indicated by len, to the access condition indicated by prot. The parameter prot can be set to, for example, a state where access is prohibited (PROT_NONE), a state where reading is allowed (PROT_READ), or a state where reading and writing are allowed (PROT_READ|PROT_WRITE). When an operating system that has no such system calls is used, it is necessary to prepare, for example, an expansion module of the operating system or a device driver separately.

In step 306, the memory classification profiler 204 waits for a predetermined time period. The time period is set as appropriate in accordance with, for example, a frequency with which the JVM 206 which executes the application program 208 accesses the memory. During step 306, a page fault occurs when access is made to data that is present in a page in a memory area to which access is prohibited, or when writing is made to data that is present in a page in a memory area to which writing is prohibited. A process performed when a page fault occurs will be described below with reference to the flowchart in FIG. 4. The JVM 206 maintains information indicating which data is present in which range indicated by memory addresses, in a table or the like. Accordingly, the JVM 206 can identify which data is being accessed, by identifying a memory address at which the access is made when a page fault occurs.

In step 308, the memory classification profiler 204 determines whether the measurement is to be ended. The determination whether the measurement is to be ended is made on the basis of, for example, an instruction from the JVM 206 which is a program to be measured, a time period that has elapsed after the measurement started, or a frequency of access made to data. When the condition under which the measurement is to be ended is not satisfied, the process returns back to step 304. Thus, one of the features of the present invention in which pages are periodically prohibited from being accessed is achieved.

In step 308, when the memory classification profiler 204 determines that the condition under which the measurement is to be ended is satisfied, the memory classification profiler 204 changes the access permission of each page from the state where access or writing to the page is prohibited to the original state in step 310, and releases the page fault handler in step 312, and the measurement is ended.

Referring to the flowchart in FIG. 4, a process performed when a page fault occurs will be described. When a page fault occurs, the memory classification profiler 204 determines whether the address at which the page fault has occurred is present in an area in which the access permission of the page has been changed, in step 402. If the determination result is positive, the memory classification profiler 204 determines whether the access is for reading, in step 404.

The determination whether the access is for reading or writing is made as follows.

The access having caused the page fault can be identified as reading access or writing access by means of a function of, for example, a CPU, a memory controller, or an operating system. In this case, this function is used for the determination.

When such a function is not provided, an instruction having caused the page fault is checked so as to determine whether the access is for reading or writing.

Alternatively, the page is first prohibited from being accessed. When a page fault occurs, it is determined that data at the address at which the page fault has occurred was accessed for reading. The access permission of the page is changed to "read-only", and the process is continued. Then, when another page fault occurs at the same address, it is determined that the address was accessed for writing. Then, the page is changed so that the page is allowed to be accessed for reading and writing, and the process is continued. Thus, the determination whether the access is for reading or writing can be made.

If the access is determined to be for reading in step 404, when a "W" mark has not been attached to the data at the address at which the page fault has occurred, the memory classification profiler 204 attaches an "R" mark to the data in step 406. These marks can be practically written in the table containing the information indicating which data is present in which range indicated by memory addresses as described above. This operation can be performed by calling back the JVM 206 which is a program to be checked. In step 408, the page is changed so that writing to the page is prohibited, and the process is ended.

On the other hand, if the access is determined to be for writing in step 404, the memory classification profiler 204 attaches a "W" mark to the data at the address at which the page fault has occurred, in step 410. This operation can be also performed by calling back the JVM 206 which is a program to be checked, and can cause the JVM 206 to perform the operation. In step 412, the access permission of the page is returned back to the original state, and the process is ended.

Back to step 402, if the address at which the page fault has occurred is not present in an area in which the access permission of a page is changed, the memory classification profiler 204 performs no special operations and the process is ended. As a result, a routine of performing a default operation for page fault is executed in step 414.

Figure 5:
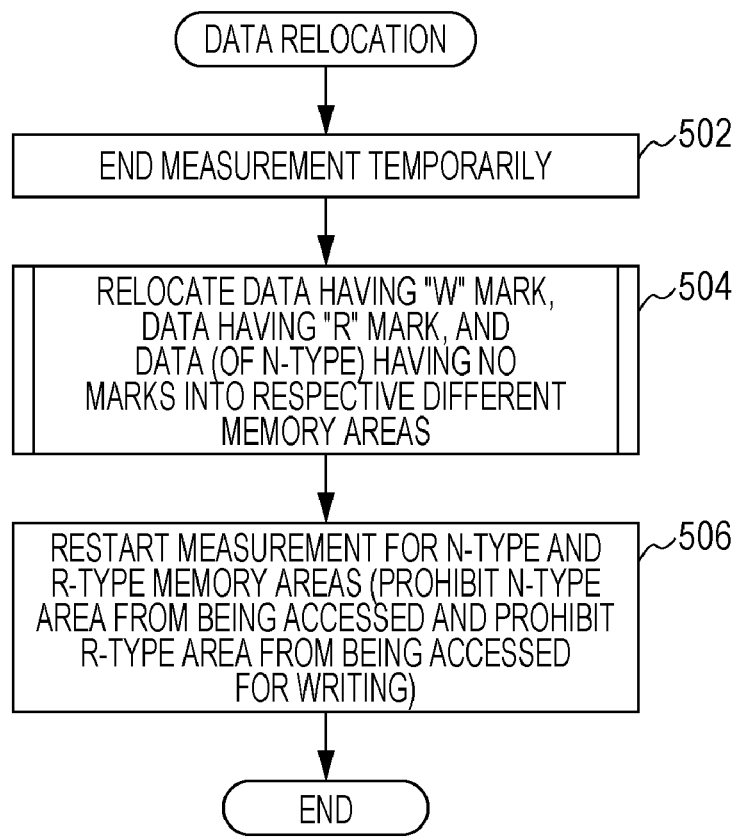
FIG. 5 is a flowchart of a data relocation process according to an embodiment of the present invention.

FIG. 5 is a flowchart of a data relocation process. A routine of performing the data relocation process is typically implemented in the JVM 206 which is a program to be measured.

In FIG. 5, when the memory classification profiler 204 is performing the measurement, the data relocation process temporarily ends the measurement of the memory classification profiler 204 in step 502. In step 504, the data relocation process relocates data to which a "W" mark is attached, data to which an "R" mark is attached, and data (of N-type) to which no marks are attached, into respective different memory areas. In step 506, the data relocation process restarts the measurement of the memory classification profiler 204 for the N-type and R-type memory areas. The N-type area is prohibited from being accessed, and the R-type area is prohibited from being accessed for writing.

If the data relocation process in FIG. 5 is performed every time a page fault occurs, the processing load becomes heavy. Accordingly, it is preferable that the memory classification profiler 204 perform only a data classification function and that the data relocation process in FIG. 5 be performed when an opportunity comes which indicates that the data classification proceeds to some extent. The opportunity is, for example, the time when garbage collection is performed, or when the application program 208 is started next.

FIG. 6 includes schematic diagrams illustrating states where the memory classification profiler 204 classifies data and the data relocation process relocates the data on the basis of the classification result.

FIG. 6(*a*) illustrates a state where data 1 to 9 are located in pages 602 to 610 in the memory. A program to be measured (the JVM 206 in the above example) calls the memory classification profiler 204 at a time point after the initialization of the program was finished, thereby periodically prohibiting the pages 602 to 610 from being accessed, and attaching labels of "R" or "W" to the data 1 to 9. Each of these labels indicates that the data has been accessed for reading or writing. After the labels are attached to some extent and an opportunity comes in a stage, the data relocation process relocates the data to which "R" labels are attached into the page 608 and the data to which "W" labels are attached into the page 610, as illustrated in FIG. 6(*b*).

In this state, the memory classification profiler 204 periodically prohibits the pages 602 to 606 from being accessed, and periodically prohibits the page 608 from being accessed for writing. It is unnecessary to change the access permission of the page 610 containing data which is classified as data to which writing has been made. Thus, data whose access property has been determined is relocated into a different page, thereby reducing an area which is prohibited from being accessed and improving the measurement efficiency.

FIG. 6(*c*) illustrates a result obtained after this process is repeated. The result indicates that data which has not been accessed at all is left in the pages 602 to 604, data to which "R" labels are attached (i.e., data to which only reading has been made) is located in the pages 606 to 608, and data to which "W" labels are attached (i.e., data to which writing has been made) is located in the page 610. As a result, the pages 602 to 604 are candidates for a page-out operation, and the pages 606 to 608 are candidates for inter-process sharing by using, for example, a copy-on-write mechanism.

Now, some examples to which the present invention is applied will be described.

One of the exemplary applications is dynamic relocation of objects in the Java® heap. The following operations are performed.

Pages in the Java® heap are divided into N-type (NoAccess), R-type (ReadOnly), and W-type (ReadWrite). Initially, all of the pages are set to N-type.

The pages of N-type are periodically or temporarily prohibited from being accessed, and the pages of R-type are prohibited from being accessed for writing. Objects to which reading or writing has been made are recorded.

Upon garbage collection (GC), each of the objects on which the above-described recording has been performed is relocated into the pages of R-type or W-type. The other objects are left in the pages of N-type. Note that during the GC, the pages in the heap can be accessed.

By repeating steps (2) to (3), objects which have been accessed are rapidly expelled into the pages of R-type or W-type and are gathered.

Through this procedure, only "objects that have not been accessed" are finally left in the pages of N-type, whereby a page-out is likely to occur. In the pages of R-type, "objects that have been accessed only for reading" are gathered. Accordingly, basic data used for, for example, heap sharing between JVMs can be obtained by analyzing the content of these gathered objects.

Another exemplary application is static relocation of class data in the Java® VM. In this case, the following operations are performed.

The operation of the present invention is applied to the class area in the Java® VM. The pages for the class data are divided into N-type, R-type, and W-type pages. At first, all pieces of the class data are located in the N-type pages.

After the initialization of the application, the pages are periodically or temporarily prohibited from being accessed, whereby class data to which reading or writing has been made is identified. The class data to which reading has been made is recorded as "R" data, and the class data to which writing has been made is recorded as "W" data.

Upon the next startup of the application, each piece of the class data which has been recorded as "R" or "W" data until the end of the previous execution is relocated into the R-type or W-type page (static relocation). If it is possible to relocate the class data dynamically like objects, this operation can be performed during the execution. In this case, the exemplary application has been described under the assumption that the operation cannot be performed during the execution.

Steps (2) to (3) are repeated every time the startup of the application is performed so that more accurate information about R-type and W-type data is obtained and pieces of the class data which have been accessed are rapidly gathered into different pages after the initialization.

Through this procedure, page-out of class data that has not been accessed after the initialization of the application is accelerated. In addition, sharing of pieces of class data between JVMs can be accelerated by analyzing class data that has been accessed only for reading.

As described above, the embodiments of the present invention have been described. Note that the present invention is not limited to a specific set of hardware and an operating system or an application program. That is, on any set of hardware and an operating system in which a memory area can be selectively prohibited from being accessed, the present invention can be implemented in any application that can dynamically or statically relocate data in the memory. For example, the present invention can be applied to a large environment system that is used in a cloud environment. Alternatively, the present invention can be applied in the case where processes are performed in a stand-alone environment.

What is claimed is:

1. A method for managing data in a memory of a computer, the method comprising:
   setting a state of a specified memory area in the memory to a first state, the first state prohibiting the specified memory area from being read or write accessed;
   detecting a page fault at an address of a first data present in the specified memory area, the page fault being a result of an access on first data; and
   in response to the access on first data being determined as a read access
      attaching, to the first data, a first mark indicating that the first data has been read, and
      altering the state to a second state, the second state enabling only read access to the specified memory area.

2. The method according to claim 1, further comprising:
   altering the state to a second state after attaching the first mark to the first data, the second state preventing write access to the specified memory area.

3. The method according to claim 1, further comprising:
   in response to the access being determined as a write access
      attaching, to the first data, a second mark indicating that the second data has been written, and
      altering the state to a third state, the third state enabling read and write access to the specified memory.

4. The method according to claim 3, further comprising:
   moving the first data to an individual memory partition based on whether the first or second mark was attached.

5. The method according to claim 4, wherein the moving of the first data is performed in response to a garbage collection or a restart of a process that executes the access on first data that caused the page fault.

6. A method for managing data in a memory of a computer, the method comprising:
   setting a state of a specified memory area in the memory to a first state, the first state prohibiting the specified memory area from being write accessed;
   detecting a page fault at an address of a first data present in the specified memory area, the page fault being a result of an access on first data; and
   in response to the access being determined as a write access
      attaching, to data, a mark indicating that the data has been written, and
      altering the state to a second state, the second state enabling read and write access to the specified memory area.

7. The method according to claim 6, further comprising:
   moving the data having the mark into a separate memory partition.

8. A computer program product for managing data in a memory of a computer, the computer program product comprising a computer readable storage medium having program instructions embodied therewith, the program instructions executable by the computer to cause the computer to:
   setting a state of a specified memory area in the memory to a first state, the first state prohibiting the specified memory area from being read or write accessed;
   detecting a page fault at an address of a first data present in the specified memory area, the page fault being a result of an access on first data; and
   in response to the access on first data being determined as a read access
      attaching, to the first data, a first mark indicating that the first data has been read, and
      altering the state to a second state, the second state enabling only read access to the specified memory area.

9. The computer readable storage medium according to claim 8, wherein the program instructions are further executable by the computer to cause:
   altering the state to a second state after attaching the first mark to the first data, the second state preventing write access to the specified memory area.

10. The computer readable storage medium according to claim 8, wherein the program instructions are further executable by the computer to cause:
    in response to the access being determined as a write access:
       attaching, to the first data, a second mark indicating that the second data has been written, and
       altering the state to a third state, the third state enabling read and write access to the specified memory area.

11. The computer readable storage medium according to claim 10, wherein the program instructions are further executable by the computer to cause:
    moving the first data to an individual memory partition based on whether the first or second mark was attached.

12. The computer readable storage medium according to claim 11, wherein the moving of the first data is performed in response to a garbage collection or a restart of a process that executes the access on first data that caused the page fault.

13. A system for managing data, comprising:
    a computer having at least one processor and a memory, the computer configured to:
    set a state of a specified memory area in the memory to a first state, wherein the first state prohibits the specified memory area from being write accessed;
    detect a page fault at an address of a first data present in the specified memory area, wherein the page fault is a result of an access on first data; and
    in response to a determination that the access is a read access:
       attach, to the first data, a first mark that indicates that the first data has been read, and
       alter the state to a second state, wherein the second state enables only read access to the specified memory area.

14. The system according to claim 13, wherein the computer is further configured to:
    alter the state to a second state after the first mark is attached to the first data, wherein the second state prevents write access to the specified memory area.

15. The system according to claim 13, wherein the computer is further configured to:
    in response to a determination that the access is a write access:
       attach, to the first data, a second mark that indicates that the second data has been written, and
       alter the state to a third state, wherein the third state enables read and write access to the specified memory area.

16. The system according to claim 15, wherein the computer is further configured to:

move the first data to an individual memory partition based on whether the first or second mark was attached.

17. The system according to claim 16, wherein the movement of the first data is performed in response to a garbage collection or a restart of a process that executes the access on first data that caused the page fault.

\* \* \* \* \*